Jan. 14, 1930. H. HOISINGTON 1,743,919
SPEED RESPONSIVE DEVICE
Filed Sept. 28, 1927   2 Sheets-Sheet 1
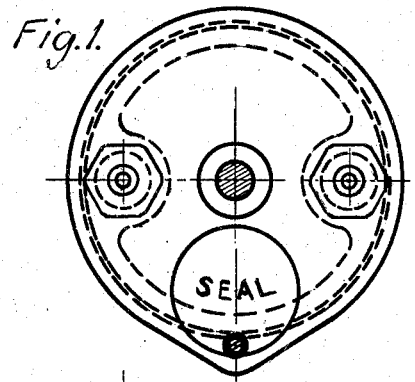
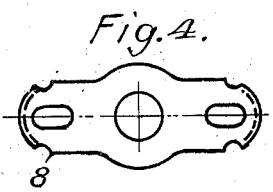
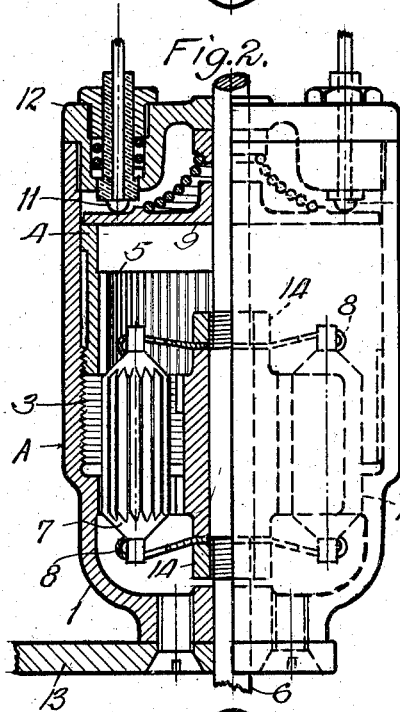
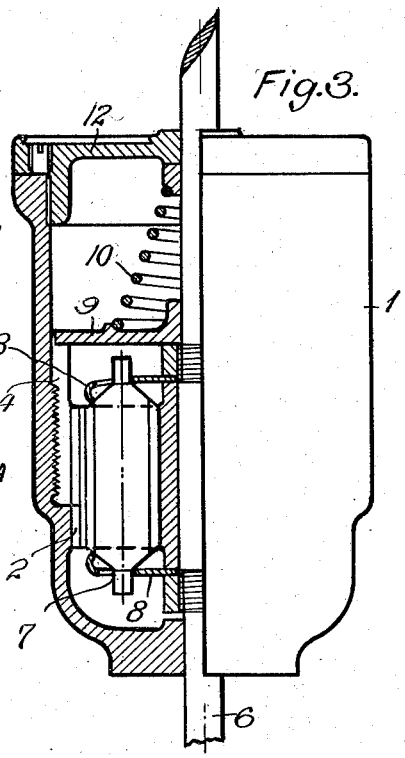
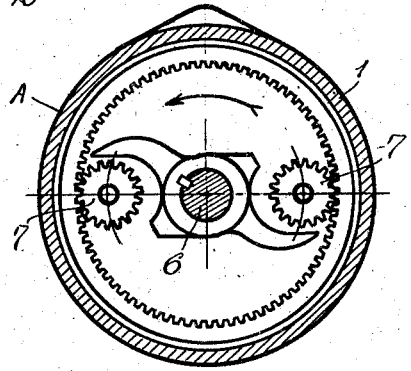
HARRY HOISINGTON
INVENTOR.
BY *Harry Hoisington*
ATTORNEY.

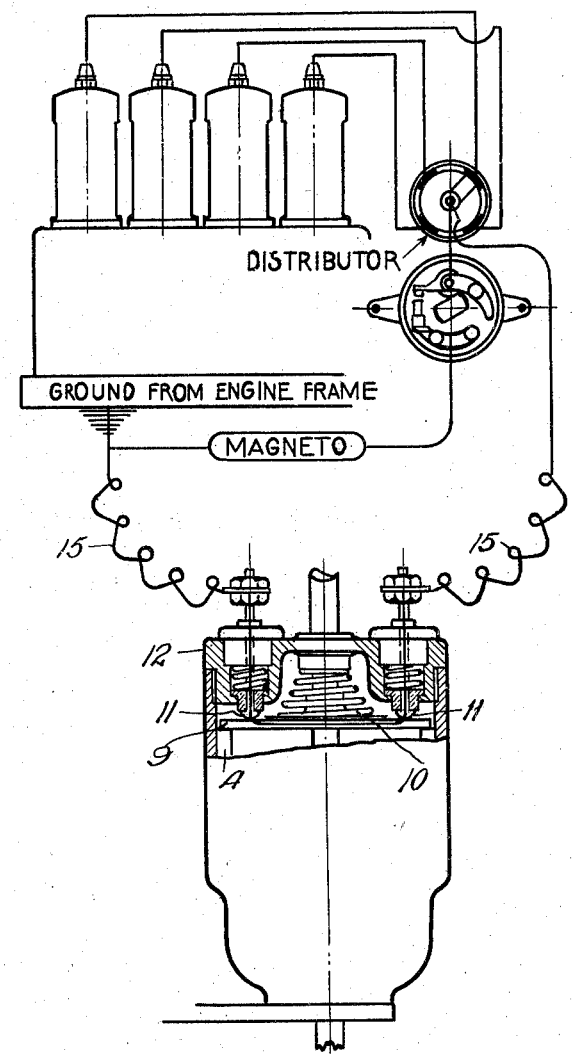
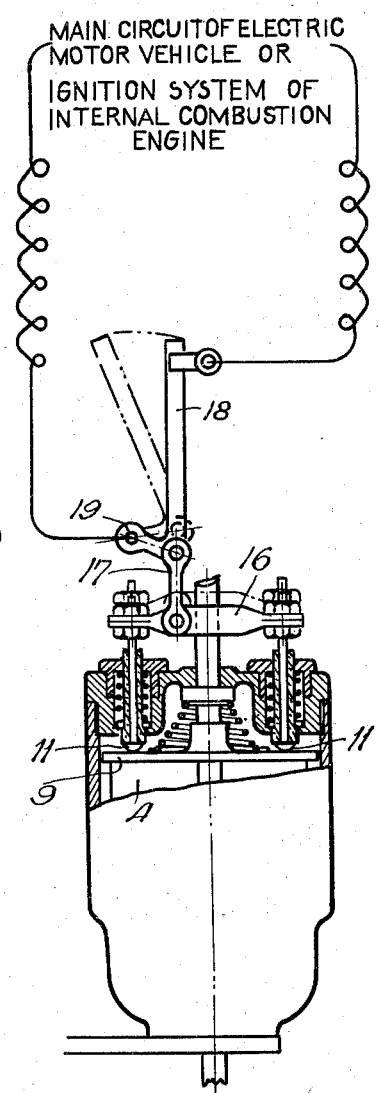

Patented Jan. 14, 1930

1,743,919

UNITED STATES PATENT OFFICE

HARRY HOISINGTON, OF DAVENPORT, IOWA

SPEED-RESPONSIVE DEVICE

Application filed September 28, 1927. Serial No. 222,527.

The invention relates to a device for operating the controls governing the flow of power to a machine, to the end that after the speed of revolution of some element of the machine has exceeded a desired maximum, the flow of power into the machine is cut off or interrupted, after which the frictional or other resistance to movement in the machine causes a reduction of the speed.

Speed responsive governors as commonly applied to power plants act to control and reduce the speed of the mechanism by a lessening of the flow of power whenever and as soon as the desired maximum speed is reached. It has not heretofore been practical to make use of such devices applied to automobiles because of the frequent necessity of sudden bursts of speed far in excess of the maximum legal speed of traffic in order to avoid jams, collisions and other emergency conditions. I have now conceived a device which is effective to interrupt or lessen the flow of power in case a predetermined speed of rotation is exceeded and the excess speed maintained beyond a fixed time or distance as represented by the number of revolutions of the shaft of the device; the device being ineffective at any speed until the said fixed time or distance (during which the speed in excess of the said predetermined speed of rotation has been maintained) has been reached.

My preferred manner of attaining this result is shown on the accompanying drawings in which Fig. 1 represents the end view of a possible casing head; Fig. 2 shows a partial section of the device in the position of full effect; Fig. 3 is a partial section with the mechanism in the ordinary, low speed, inoperative condition; Fig. 4 a plan view of the preferred pinion spring; and Fig. 5 a section on line A—A of Fig. 2. Fig. 6 is a diagram showing the device arranged to short circuit the ignition current of an internal combustion motor and Fig. 7 shows the device with plungers arranged to operate an electric switch.

1 is a casing or fixed member, with a fixed internal gear 2 and a threaded section 3. 4 is a movable ring member or sleeve thread on the outside and with an internal gear 5 on the inside. The internal gear 5 will have the same pitch diameter as the internal gear 2 of the casing but will have a different number of teeth. 6 is a shaft on which pinions 7—7 are so mounted that they are forced to revolve about and with the shaft 6, but may move outwardly in a plane passing through the axis of the shaft. Pinions 7—7 are restrained by the springs 8—8, which tend to hold the pinions close to the body of the shaft and to return them to that position whenever the pinions are moved away from the shaft. 9 is a diaphragm of sufficient diameter to contact with the end of sleeve 4 and slidably mounted on shaft 6. 10 is a spring, bearing in a suitable centering groove or ring boss of the diaphragm and against a collar of shaft 6 and tending to return diaphragm 9 to the position shown in Fig. 3. 11—11 are electrical poles or mechanical plungers, as the case may be, by or through which diaphragm 9 in its extended position is made effective to interrupt the application of power and thus to reduce the speed of the mechanism. 12 is a head or closure to the casing 1. 13 is a bracket by which the casing 1 (or the head 12) is fixed to a convenient element of the machine to be controlled, in such manner as to prevent rotation of the casing with the shaft.

14—14 are nuts threaded onto shaft 6. 15—15 in Fig. 6 are connecting wires forming with insulated poles 11—11 and diaphragm 9 (when in contact) a shunt of the usual automobile ignition circuit, which is then impotent in the engine. In Fig. 7 11—11 are shown as twin plungers attached to a crosshead 16. 17 is a link between crosshead 16 and the bell-crank switch blade 18 pivoted at 19. Constructed as in Fig. 7, a further movement of the diaphragm forces the plungers outwardly and causes the switch blade to swing about pivot 19 and break or open an electric circuit whose closure is necessary to the flow of power.

Figures 6 and 7 show two ways in which my device may be applied effective to directly reduce the speed by interrupting the flow of power but the exact arrangement outside the case of the device is not essential to the invention and may operate in innumerable other ways to retard the spark or to close a valve in the gas supply of an engine or even to operate a signal only, depending upon the operator of the motive power to manipulate the actual controls of speed.

I therefore reserve the right to make use of any of the methods mentioned or any similar method to make my device effective to interrupt or reduce the flow of power.

To better accomplish their functions as explained above, I prefer to form the springs 8—8 of sheet metal perforated to assemble over the shaft and to be held against shoulders provided on the shaft, by nuts 14. The outer ends of the springs 8—8 I slot to embrace trunnions formed on the ends of the pinions; and I further turn the tips or outermost points of the springs inwardly toward the pinions to bear and exert pressure against the conical bases for the trunnions on the pinions so that as the pinions move from the shaft the tips or outer points of the springs are spread farther apart by the wedge-like action of the pinion cones as shown in section in Figures 2 and 3 and in plan in Figure 4.

The action of the device is as follows:

The shaft, pinions and springs freely revolve in either direction inoperatively until the speed becomes such that the components of force acting on the pinions by reason of their inertia is sufficient to overcome the resistance of the springs 8. In the case of an automobile, this will naturally occur only in the direction of forward motion, as indicated by the arrow in the drawing Fig. 5. The pinions move away from the shaft, spreading the points of springs 8—8 farther apart, and continue until contact of the pinions with the gears, or of the trunnions with the outer ends of the slots in the springs, limits their outward movement. As soon as the radial distances from the axis of the shaft to the axes of the pinions are increased, the total path of motion of the pinions is lengthened and the tendency of the pinions to move from the center is multiplied. The casing does not revolve. The pinions move outwardly and come simultaneously into mesh with the internal gears 2 and 5, and roll around in them. Should internal gear 5 of the movable ring have been formed with seventy teeth and the fixed internal gear have seventy-two teeth, the movable ring will be turned in a direction contrary to the direction of movement of the shaft two-seventieths of a complete revolution for each turn of the shaft and thereby be moved in the threads 3 of the casing, which will have a direction such as to cause the movable ring to move away from the fixed internal gear. The actual number of teeth in the internal gears and the length of thread to be traversed by the movable ring before the diaphragm 9, which is pushed along the shaft by the movable ring 4, comes into effective contact with the poles or plungers 11—11 will have been determined by the length of time or distance through which it is desired to allow the use of the excess speed. For example, supposing the device so mounted that its shaft forms part of an odometer shaft making 2400 revolutions per mile; let the fixed internal gear have 122 teeth, the movable internal gear 120 teeth, the pitch of the threads be 20 per inch and the travel of the diaphragm 0.65-inch before contact with the poles, then the car may proceed at excess speed for $$\frac{120}{2} \times 0.65 \times 20 = 780$$

revolutions of the shaft, or approximately one-third mile, before the device acts to reduce the speed.

But, having driven at excess speed for a short distance only, should the driver voluntarily reduce the speed below that for which the device is adjusted, the centrifugal force of the pinions will be unable to withstand the pressure of the springs 8, and the pinions will return to their inoperative position out of mesh with the gears, the friction of the spiral spring 10 against a collar revolving with the shaft will cause spring 10, diaphragm 9 and movable ring 4 to revolve in the direction of the shaft, the movable ring will screw into the threads 3 and all parts will return to their original inoperative position. Similarly, should the effective contact of the diaphragm with the poles or plungers 11—11 be made to result in temporary reduction of speed only, the device will return to its inoperative position as soon as the speed is sufficiently reduced; however, it is not the intention of this specification to determine whether the reduction of speed effected by the mechanism of this device in the position of full effect shall be temporary or permanent.

Referring to the drawing, Figure 2, it will be observed that the movable ring is shown as moved by the threads, so far that the pinions are entirely out of mesh with the movable internal gear which is therefore no longer constrained to revolve in a direction opposite to the movement of the shaft. It is conceivable that the limit of movement of the diaphragm 9 may occur with the automobile on a down grade or in other conditions where the speed will not be instantly reduced below the point at which the pinions may be withdrawn by the springs 8—8 and it is therefore necessary that the movable ring shall either draw off the pinions as shown, or run out of the thread in the casing in order to prevent damage to the device. Conditions of design may arise to make it preferable in some cases that the pinions disengage while the threads remain engaged, and in other cases that the threads disengage while the pinions are still in mesh, therefore the drawing must not be construed as requiring one construction to the exclusion of the other, nor is the representation of sweeps on the body of the shaft following the pinions and designed to maintain the alignment of the pinions, to be construed as excluding and preventing my use of any other method of providing for the maintenance of alignment of the pinions not incompatible with the other stipulations of this specification.

Having now fully described the preferred construction and the action of my speed responsive device, I claim:

1. In a speed responsive device, weights shaped as toothed pinions disposed about and parallel with a revolving shaft, said pinions constrained to revolve about and with said shaft, said pinions movable to increase the distances from their axes to the axis of said shaft, and gears internally toothed and located concentrically about said revolving shaft, to wit, one fixed gear and one movable gear, said gears to have a common pitch diameter but with dissimilar numbers of teeth, said pinions at the limit of their possible outward movement from the shaft to engage said gears and cause said movable gear to operate other members of the device.

2. In a speed responsive device having weights shaped as toothed pinions symmetrically disposed about a revolving shaft and said pinions movable to increase their distances from the axis of said shaft, springs forged or formed from sheet metal and located on said shaft facing the ends of said pinions, said springs slotted to assemble over trunnions formed on either end of each of said pinions, said slots to allow movement of said pinion trunnions from and toward said shaft, the outermost points of said springs turned toward said pinions and formed to a bearing against conical trunnion bases formed on said pinions, said outer points of said springs to exert pressure against said conical trunnion bases on the side farthest from said shaft to restrain and return said pinions toward said shaft; and means for holding said springs in position and adjustment on said shaft.

3. In a speed responsive device, the combination of weights shaped as toothed pinions revolving about and with a shaft and movable from and toward the shaft; springs to restrain and return said pinions toward the shaft; a fixed member having an internally threaded section and an adjacent internally toothed gear section embracing said shaft and pinions; a movable ring having an internally toothed gear section of like diameter with the internal gear of said fixed member but with a differing number of teeth, said movable ring having an exterior thread to suit said internally threaded section of said fixed member; a diaphragm slidably mounted on the shaft and positioned against the end of said movable ring member opposite said fixed member; a spiral spring positioned against a collar fixed to the shaft and said spring effective against said diaphragm to return said movable ring member to a position adjacent to the internal gear section of the fixed member; and means whereby the said movable ring member, said diaphragm and the extended positions thereof shall effect and cause an interruption to the flow of power to the mechanism.

HARRY HOISINGTON.